United States Patent [19]
Sako

[11] Patent Number: 5,887,222
[45] Date of Patent: Mar. 23, 1999

[54] IMAGE FORMING APPARATUS AND METHOD FOR CONTROLLING EXPOSURE CONDITIONS

[75] Inventor: Mineyuki Sako, Toyokawa, Japan

[73] Assignee: Minolta Co., Ltd., Osaka, Japan

[21] Appl. No.: 979,551

[22] Filed: Nov. 26, 1997

[30] Foreign Application Priority Data

Nov. 27, 1996 [JP] Japan .................................. 8-316015

[51] Int. Cl.$^6$ ................................................ G03G 15/04
[52] U.S. Cl. ................................................ 399/51; 399/26
[58] Field of Search ........................................ 399/26, 51

[56] References Cited

U.S. PATENT DOCUMENTS

| | | | |
|---|---|---|---|
| 4,136,945 | 1/1979 | Stephens | 399/43 |
| 5,017,963 | 5/1991 | Tuhro | 399/190 |
| 5,160,967 | 11/1992 | Tonegawa | 399/26 |
| 5,278,612 | 1/1994 | Inui | 399/26 |
| 5,394,221 | 2/1995 | Kishimoto et al. | 399/51 X |
| 5,726,759 | 3/1998 | Watanabe et al. | 399/26 X |

*Primary Examiner*—Fred L. Braun
*Attorney, Agent, or Firm*—Burns, Doane, Swecker & Mathis, LLP

[57] ABSTRACT

An image forming apparatus having a photosensitive unit including a film disposed thereon. The film wears over time causing its thickness to decrease, which causes non-uniformity in line image data produced by the apparatus. The invention counteracts changes in the film thickness by adjusting the intensity of the edges of the image in response to the amount of wear the apparatus has undergone. The amount of wear can be gauged by detecting the number of rotations made by the photosensitive unit or the number of sheets processed by the photosensitive unit. The invention has the particular advantage of ensuring consistency in the thickness of line images. A method for controlling exposure is also described.

17 Claims, 5 Drawing Sheets

IMAGE FORMING APPARATUS AND METHOD FOR CONTROLLING EXPOSURE CONDITIONS

BACKGROUND

1. Field of the Invention

The present invention pertains to an image forming apparatus, such as a copying machine, printer, or like device, and a method for operating such an image forming apparatus.

2. Description of the Related Art

An image forming apparatus using an electrophotographic image forming technique, as used, for example, in a digital copying machine, can determine characteristics of an input image and then perform processing which is suited to the determined characteristics. For example, such an apparatus can emphasize the edges of characters in images containing character data. To perform this function, an edge is recognized in the image data based on whether or not the difference in density between a target pixel and its surrounding pixels exceeds a prescribed threshold value. A latent image is then formed on a photosensitive unit based on the image data thus processed. The latent image is developed, and then the developed image is transferred to a sheet of paper. In this manner, the image of a character in which the edges are emphasized can be reproduced.

In a conventional image forming apparatus, when the photosensitive unit is exposed to light in order to form a latent image, the electric charge (comprising electrons and electron holes) occurring at exposed areas of the photosensitive unit becomes diffused as it moves toward the surface of the photosensitive unit. As a result, the electric charge can expand to these exposed areas, which leads to thickening of the image.

In an image forming apparatus using an organic photosensitive unit, the film thickness disposed on the photosensitive unit varies depending on how often the photosensitive unit has been used. The film thickness, in turn, affects the level of diffusion of the electric charge. When the film is thick, the range of diffusion is relatively large, and when the film is thin, the range of diffusion is relatively small. Therefore, the latent image formed by such an apparatus changes depending on how often the photosensitive unit has been used. This effect is particularly noticeable in line images, in which the thickness of the line image changes as a function of the amount of use of the photosensitive unit. Generally, the line image increases in thickness as the film increases in thickness.

A problem therefore arises in conventional reverse image forming apparatuses in that the thickness of a line image varies depending on how often the photosensitive unit is used. In other words, the conventional apparatuses do not provide consistent line image thicknesses over time.

SUMMARY

An exemplary objective of the present invention is to resolve the problem described above by compensating for the degradation of line image quality associated with the degree of use of the image forming apparatus.

Another exemplary objective of the present invention is to provide an image forming apparatus which provides line images having constant thickness over time.

Yet another exemplary objective of the present invention is to provide an image forming apparatus which provides images having constant thickness regardless of the condition of the photosensitive unit.

These and other objectives are attained by an image forming apparatus comprising a photosensitive unit; an exposure means that exposes the photosensitive unit and forms latent images thereon; a developing means that develops the latent images; a line image detecting means that detects line images from input image information; a state detecting means that detects a state of the photosensitive unit; and an exposure control means that controls, in response to information from the state detecting means, the exposure conditions during the formation of latent images of line images detected by the line image detecting means.

These and other objects are also attained by an image forming apparatus comprising a photosensitive unit that carries the latent images; an exposure means that exposes the photosensitive unit and forms latent images; a developing means that develops the latent images; an edge detecting means that detects the edges of the images based on input image information; a state detecting means that detects the state of the photosensitive unit; and an exposure control means that controls, in response to information from the state detecting means, the exposure conditions during the formation of latent images of the edges of the images detected by the edge detecting means.

According to another exemplary aspect of the invention, a method is provided for forming an image using an image forming apparatus having a photosensitive unit. The method comprises the steps of: detecting a state of the photosensitive unit to produce a state output signal; detecting edges of input image information to produce detected edge output signals; modifying the detected edge output signals as a function of the state output signal to produce modified detected edge output signals; and exposing the photosensitive unit and forming a latent image thereon on the basis of the modified detected edge output signals.

BRIEF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference numbers throughout the several drawings.

DETAILED DESCRIPTION OF THE PREFERRED EMBODIMENT

An exemplary embodiment of the present invention is explained below with reference to the attached drawings.

Figure 1:
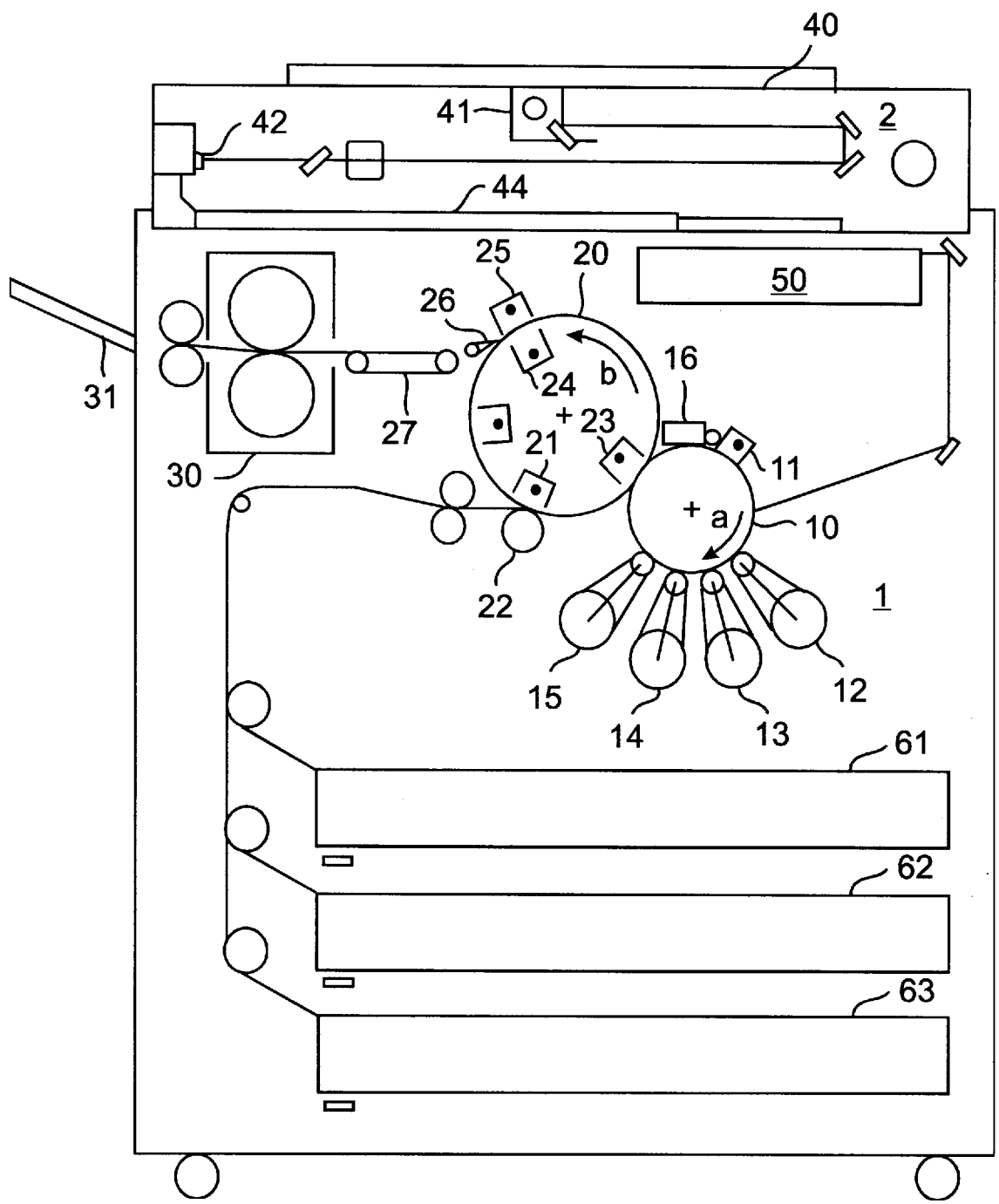
FIG. 1 is a cross-sectional view showing an exemplary construction of a copying machine for use in the present invention.

FIG. 1 shows a digital copying machine according to one embodiment of the present invention. This digital copying machine comprises image reader 2 that reads original images and a printer 1 that reproduces the images read.

In the image reader 2, the original document is irradiated by scanner 41 and the reflected light from the original document is converted into electric signals by CCD sensor 42. Analog data based on the reflected light obtained from the scanning of the original document is input to image processing unit 44 where digital image signals are generated based on the analog data. The digital image signals thus obtained are sent to print head 50 of printer 1.

In printer 1, photosensitive drum 10 is driven to rotate in the direction of arrow a. A transfer drum 20 is located adjacent to photosensitive drum 10. This drum is driven to rotate in the direction of arrow b. A plurality of units are associated with the photosensitive drum 10, including a charger 11 for charging the photosensitive drum 10, magnetic brush-type developers 12, 13, 14 and 15 for generating a toner image using four different respective colors, cleaning device 16 for cleaning residual toner from the photosensitive drum 10, etc. During image formation, photosensitive drum 10 is electrically charged using charger 11, after which photosensitive drum 10 is scanned using a laser beam by means of print head 50 to form latent images. The latent images are then developed by means of one of developers 12 through 15. At this stage, the latent images appear on the photosensitive unit as toner images.

The copying machine also includes three automatic paper feeders 61, 62 and 63 mounted in printer 1. The paper that is fed from one of the automatic paper feeders 61, 62 or 63 is sent onto transfer drum 20 and is statically adsorbed onto transfer drum 20 by means of paper adsorption roller 22 and paper adsorption charger 21. The toner images on photosensitive drum 10 are transferred onto the paper on transfer drum 20 by means of transfer charger 23. The number of transfers corresponds to the number of toner colors used.

The paper is then separated from transfer drum 20 by means of separating chargers 24 and 25 and separating claw 26. The paper is then conveyed to fuser 30 by means of conveyance device 27. The toner images are heated and fused onto the paper by means of fuser 30, after which the paper is ejected onto paper eject tray 31.

Figure 2:
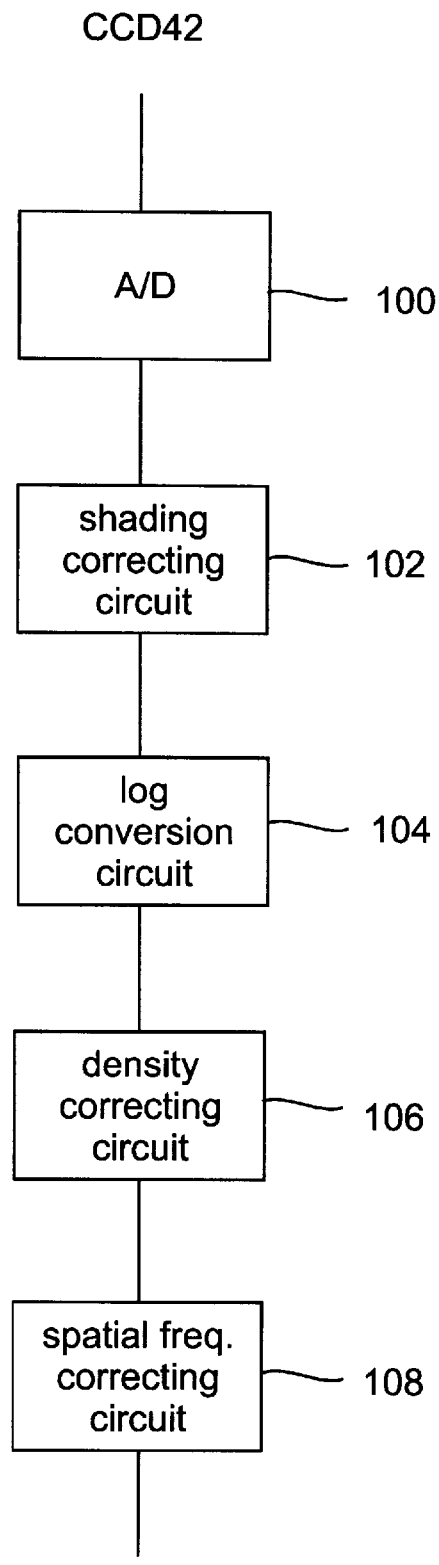
FIG. 2 is a block diagram showing the flow of the image signal processing according to the present invention.

FIG. 2 shows the exemplary construction of image processing unit 44 of FIG. 1. The sequence of image processing from CCD sensor 42 to image processing unit 44 to print head 50 will be explained with reference to this drawing.

First, the reflected light signals input from CCD sensor 42 are converted into multi-level digital values by A/D converter 100. Shading correcting circuit 102 then performs shading correction on the multi-level digital values. The corrected digital values are then further converted into density data by log conversion circuit 104. In density correcting circuit 106, the density data is multiplied by a prescribed coefficient to carry out density correction to reduce the discrepancy between the generated image and an ideal image. Data correction is carried out in spatial frequency correcting circuit 108 in response to the characteristics of the images and the frequency of use of the photosensitive unit, as will be described in greater detail below. The data from spatial frequency correcting circuit 108 is sent to print head 50 as print data.

Figure 3:
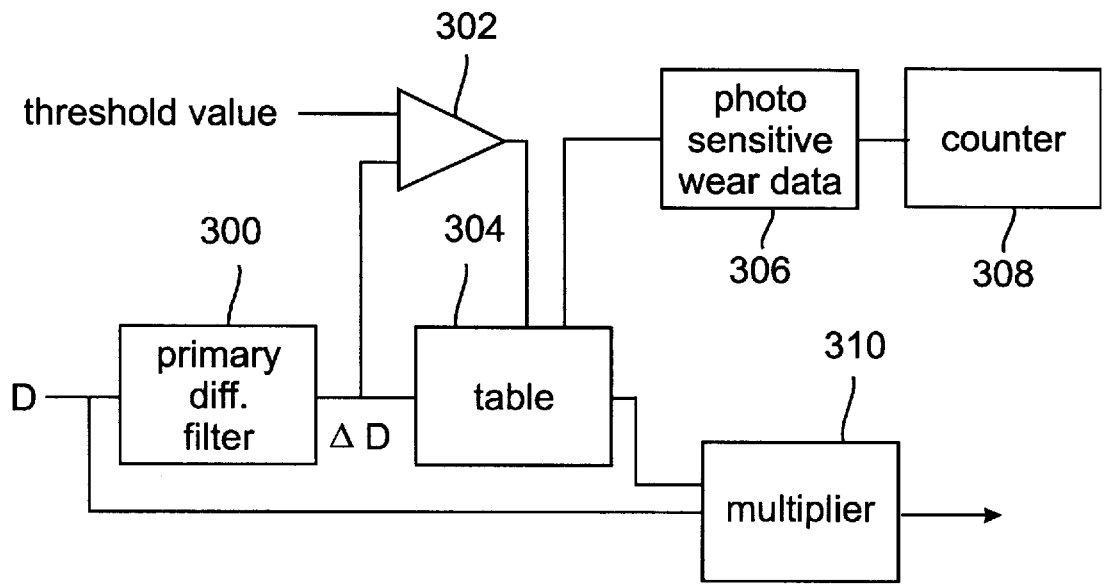
FIG. 3 is a block diagram showing a part of the spatial frequency correcting circuit of FIG. 2.

FIG. 3 is a block diagram of part of the spatial frequency correcting circuit 108 in image processing unit 44. First, the filtering routine employed by the spatial frequency correcting circuit 108 will be explained.

In this embodiment, primary differential filter 300 is used to differentiate density signal D from density correcting circuit 106 to generate differential value $\Delta D$. This value $\Delta D$ is then compared with a prescribed threshold value by comparator 302. When the value $\Delta D$ is equal to or greater than the threshold value, the pixel represented by differential value $\Delta D$ is deemed to indicate the edge of an image, whereupon an 'H'-level edge signal is output to table 304.

Figure 4:
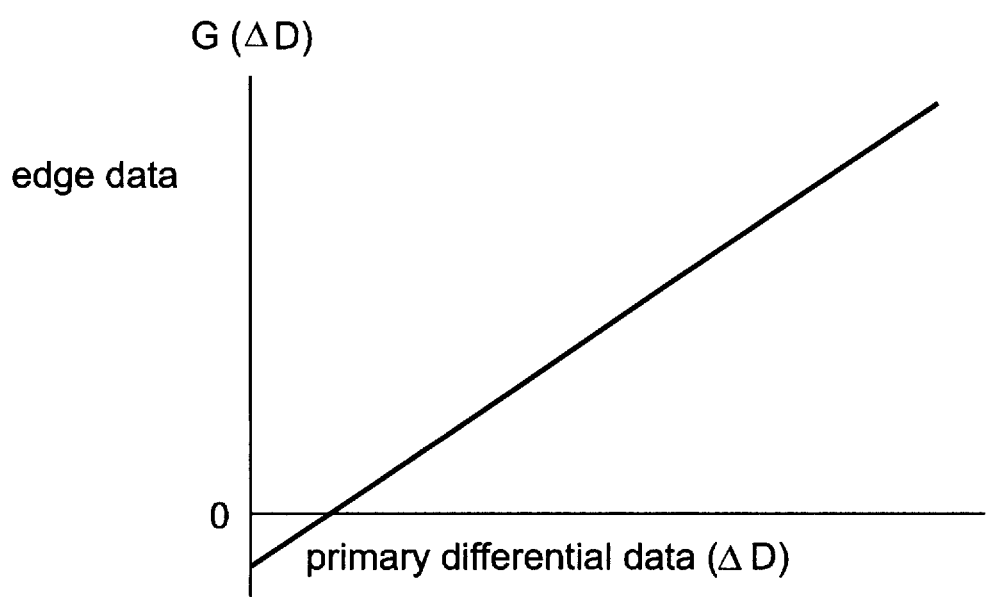
FIG. 4 shows the relationship between the edge intensity output and the primary differential data.

FIG. 4 shows the relationship between primary differential data $\Delta D$ output by primary differential filter 300 and edge intensity output $G(\Delta D)$. Data defining function $G(\Delta D)$ is stored beforehand in table 304. The areas where edge intensity output G is negative represent halftone areas, while the areas where edge intensity output G is positive represent edges. When primary differential data $\Delta D$ is obtained with regard to the density data for one pixel and if $\Delta D$ is larger than the threshold value, the edge intensity in that pixel can be obtained based on function $G(\Delta D)$ shown in FIG. 4. Where $\Delta D$ is larger than the threshold value (i.e., only for edges), table 304 outputs edge intensity data to analog multiplier 310.

A reverse image forming apparatus having a new photosensitive unit will typically have a thick film, and as such, it is desirable to compensate for effects that the film thickness has on the lines images. Accordingly, for the edge of an image (i.e., where an 'H'-level edge signal is output to table 304), the edge intensity shown in FIG. 4 is adjusted in accordance with the photosensitive unit wear data that is stored in photosensitive unit wear data circuit 306. In one exemplary embodiment, a corrective coefficient that corresponds to the number of rotations previously experienced by the photosensitive unit is used as photosensitive unit wear data 306.

Table 1 (below) shows exemplary corrective coefficients that are set in response to the number of rotations experienced by photosensitive unit 10. The number of rotations is counted by counter 308. The film thickness of the photosensitive unit typically decreases as photosensitive unit 10 rotates. Therefore, the corrective coefficient is a function of the number of past rotations. In this embodiment, the number of rotations counted is divided into three levels, i.e., 10,000 or more rotations, 5,000 to 10,000 rotations, and 0 to 5,000 rotations, which are assigned the labels large, medium and small, respectively. The corrective coefficients for each of the levels are set to be 0.90, 0.94 and 0.98, respectively, in one exemplary embodiment. The level of wear is determined by comparing the number of rotations counted by means of counter 308 with threshold values 5,000 and 10,000, and a corrective coefficient is determined in accordance with this level of wear, as shown in Table 1.

TABLE 1

| | Corrective Coefficients | | |
|---|---|---|---|
| Number of rotations (time) | Number of sheets used for image formation | Level of wear | Corrective Co-efficient |
| 10,000 rotations or more | 3,000 sheets or more | Large | 0.90 |
| 5,000 to 10,000 rotations | 1,500 to 3,000 sheets | Medium | 0.94 |
| Fewer than 5,000 rotations | Fewer than 1,500 sheets | Small | 0.98 |

This corrective coefficient should be set such that the level of edge intensity is kept constant regardless of the level of wear. In table 304, the corrective coefficient from photosensitive unit wear data circuit 306 is multiplied by edge intensity G. In other words, if the level of wear is small (where the film is thick), the edge intensity is made small.

The edge intensity is made larger as the level of wear increases. In summary, photosensitive unit wear data circuit 306 and table 304 determine the image forming conditions for the pixel for which an edge was detected by means of a corrective coefficient corresponding to the number of rotations previously experienced by the photosensitive unit as counted by counter 308.

The level of wear can also be assessed by counting the number of sheets used for image formation instead of counting the number of rotations previously experienced by the photosensitive unit. In this case, however, slight errors in the amount of use (i.e., time of use) of the photosensitive unit arise depending on the size of the paper used. Nevertheless, as a general means of control, the number of sheets used for image formation is a useful parameter in determining the level of wear.

As shown in Table 1, the number of sheets used for image formation is divided into three levels, i.e., 3,000 sheets or more, 1,500 to 3,000 sheets, and 0 to 1,500 sheets, (corresponding to the wear levels of large, medium and small, respectively), and the corrective coefficients are set to be, 0.90, 0.94 and 0.98, respectively.

Those skilled in the art will appreciate that different coefficients can be selected to suit different copying machines having different characteristics. Furthermore, more than three gradations of wear data categories can be formed having a like number of respective corrective coefficients. Also, other means for assessing the wear on the copy machine can be used, including logging the accumulated time during which the copy machine has been operating.

As shown in FIG. 3, analog multiplier 310 outputs emphasized density data D based on the corrected edge intensity data from table 304 by multiplying the original density data D with the corrected intensity data from table 304. As is clear from FIG. 5, as the level of wear increases (as the film becomes thin), the edge intensity is increased. Incidentally, because no correction is performed for areas other than edges, the corrective coefficient output from table 304 is 1.0 for these areas.

Figure 6:
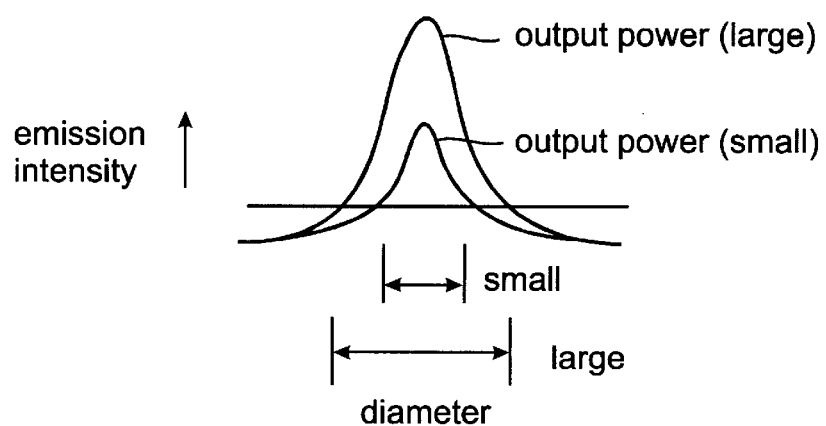
FIG. 6 shows the relationship between the output from the laser diode and the beam diameter.
Figure 7:
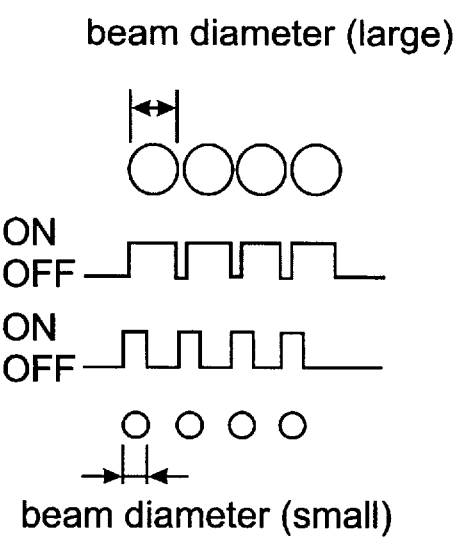
FIG. 7 shows the relationship between the duty ratio and the beam diameter of the light emission from the laser diode.

In print head 50, the laser diode drive unit generates a drive signal based on the density data from image processing unit 44, and the laser diode emits a beam to expose the photosensitive unit 10. Intensity modulation as shown in FIG. 6 and time modulation as shown in FIG. 7 can be used to expose the photosensitive unit 10. The laser diode drive unit controls the emission intensity (drive electric current) or the emission period in one cycle (duty ratio) based on the density. In the control of exposure regarding the pixel for which an edge is detected, when the photosensitive unit is new, the emission intensity is made small if intensity modulation is used and the emission duty ratio is made small if time modulation is used, in order to limit the exposure of the photosensitive unit. The amount of exposure is gradually increased, however, as the wear of the photosensitive unit progresses. The photosensitive unit is exposed in this way based on the image signals that are generated.

In the case of the intensity modulation exposure method shown in FIG. 6, for example, the drive electric current (or the output power) of the laser diode (LD) that emits a beam to expose the photosensitive unit 10 is modulated in response to the density data (where the emission cycle is constant). FIG. 6 shows two types of light output power. As the drive electric current increases, the output power increases and the beam diameter increases. When the film of the photosensitive unit is thick, the density data is made smaller as shown in FIG. 6, and consequently the intensity becomes smaller and the beam diameter decreases, which contributes to making the line images thin.

Figure 5:
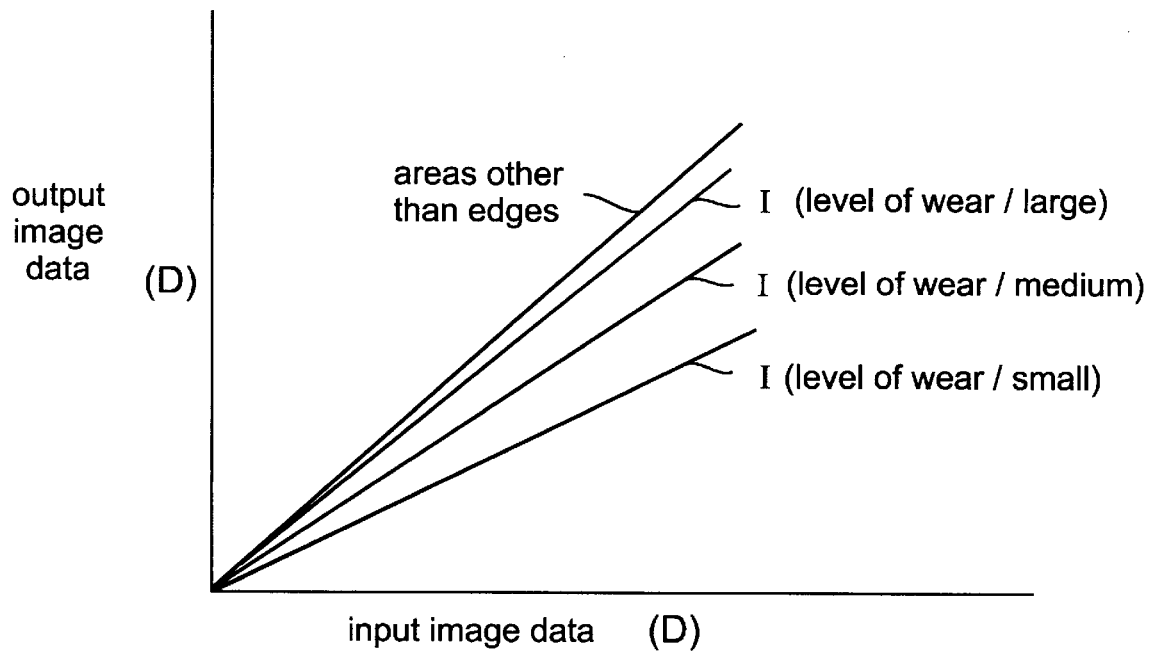
FIG. 5 shows the relationship between the output image data and input image data.

On the other hand, if time modulation exposure is used (in which the emission intensity is constant), as shown in FIG. 7, as the emission duty ratio increases, the pulse width, i.e., the emission period (the period during which the drive signal is ON) increases and the beam width increases. When the film of the photosensitive unit is thick, the density data is made smaller as shown in FIG. 5, and consequently the emission period becomes shorter and the beam width narrows, which contributes to making the line thinner. In other words, because the exposure conditions are controlled, as in the example shown in FIG. 7, stable line images can be obtained regardless of how frequently the photosensitive unit has been used.

In the embodiment described above, line images having a constant sharpness can be reproduced by detecting the edge of an image and controlling the exposure conditions used for the formation of the image corresponding to the edge. In other words, in this embodiment, the same processing used for the reproduction of a line image is carried out for the edges of solid images as well. However, such processing does not as a practical matter affect the image quality of the edges of solid images; the image quality is improved with regard to line images only. Accordingly, line images of a constant thickness can be reproduced.

On the other hand, line images having a constant thickness can be reproduced by extracting line images of a prescribed thickness and controlling the exposure conditions used for the formation of the extracted line images. More specifically, line images of a prescribed thickness can be extracted by performing edge detection from both sides of an image and checking the thickness of the image between the edges detected. Extracting line images only in this way and changing the latent image forming conditions during the image formation for those line images is also within the scope of the present invention.

However, as described above, even when the same processing is carried out for the edges of all images, images other than line images (solid images, for example) are not affected in any way and only line images are reproduced with a better result. As such, the present invention can be implemented with fewer edge detections by not specifically discriminating line image edges from other image edges. In this embodiment, the exposure conditions are changed with regard to the edges of all images.

The present invention also pertains to a method for forming an image using an image forming apparatus having a photosensitive unit. The method comprises the steps of: detecting a state of the photosensitive unit to produce a state output signal; detecting edges of images based on input image information to produce detected edge output signals; modifying the detected edge output signals as a function of the state output signal to produce modified detected edge output signals; and exposing the photosensitive unit and forming a latent image thereon on the basis of the modified detected edge output signals.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

We claim:

1. An image forming apparatus comprising:

a photosensitive unit;

an exposure means for exposing said photosensitive unit and forming latent images in response to input image information;

a developing means for developing the latent images to form toner images;

an edge detecting means for detecting edges of the input image information;

a state detecting means for detecting a state of the photosensitive unit; and an exposure control means for controlling, in response to information from said state detecting means, exposure conditions during the formation of latent images of the image edges detected by said edge detecting means.

2. The image forming apparatus of claim 1, wherein said state detecting means includes a photosensitive wear data circuit for providing a measure of the amount of wear that said image forming apparatus has undergone.

3. The image forming apparatus of claim 2, wherein said measure of the amount of wear comprises a count of a number of rotations made by said photosensitive unit.

4. The image forming apparatus of claim 2, wherein said measure of the amount of wear comprises a count of a number of sheets processed by said image forming apparatus.

5. The image forming apparatus of claim 2, wherein said measure of the amount of wear is proportional to a thickness of an outer layer disposed on said photosensitive unit.

6. The image forming apparatus of claim 2, wherein said photosensitive wear data circuit stores at least one coefficient representative of said amount of wear that said image forming apparatus has undergone.

7. The image forming apparatus of claim 6, further including a table circuit for multiplying an edge emphasis value by said at least one coefficient to adjust a thickness of a line image formed on said photosensitive unit.

8. The image forming apparatus of claim 1, wherein said edge detecting means detects all edges in the input image information, including edges associated with boundaries of solid object images and line images.

9. The image forming apparatus of claim 1, wherein said edge detecting means detects only edges of line images in the said input image information.

10. The image forming apparatus of claim 1, wherein said exposure control means controls, in response to information from said state detecting means, power applied to said exposure means in forming said latent image.

11. The image forming apparatus of claim 1, wherein said exposure control means controls, in response to information from said state detecting means, a duty cycle of said exposure means in forming said latent image.

12. An image forming apparatus comprising:

a photosensitive unit;

an exposure device that exposes said photosensitive unit and forms latent images in response to input image information;

a developing device that develops the latent images to form toner images;

an edge detector that detects image edges of the input image information;

a state detector that detects a state of the photosensitive unit; and wherein said exposure device controls, in response to information from said state detector, the exposure conditions during the formation of latent images of image edges detected by said edge detector.

13. A method for forming an image using an image forming apparatus having a photosensitive unit, comprising the steps of:

detecting a state of said photosensitive unit to produce a state output signal;

detecting edges of input image information to produce detected edge output signals;

modifying said detected edge output signals as a function of said state output signal to produce modified detected edge output signals; and exposing said photosensitive unit and forming a latent image thereon on the basis of said modified detected edge output signals.

14. The method of claim 13, wherein said state detecting step includes measuring the amount of wear that said image forming apparatus has undergone to produce a measure of the amount of wear.

15. The method of claim 14, wherein said measure of the amount of wear comprises a count of a number of rotations made by said photosensitive unit.

16. The method of claim 14, wherein said measure of the amount of wear comprises a count of a number of sheets processed by said image forming apparatus.

17. The method of claim 14, wherein said measure of the amount of wear is proportional to a thickness of an outer layer disposed on said photosensitive unit.

* * * * *